(12) United States Patent
Niemoeller et al.

(10) Patent No.: US 8,472,601 B2
(45) Date of Patent: Jun. 25, 2013

(54) CONTROLLING THE CHARGING OF A COMPOSITE SERVICE

(75) Inventors: Joerg Niemoeller, Herzogenrath (DE);
Roman Levenshteyn, Aachen (DE);
Ioannis Fikouras, Stockholm (DE);
Raphael Quinet, Liége (BE)

(73) Assignee: Telefonaktiebolaget L M Ericcson (Publ), Stockholm (SE)

( * ) Notice: Subject to any disclaimer, the term of this patent is extended or adjusted under 35 U.S.C. 154(b) by 143 days.

(21) Appl. No.: 13/058,031

(22) PCT Filed: Aug. 14, 2008

(86) PCT No.: PCT/EP2008/060711
§ 371 (c)(1),
(2), (4) Date: Feb. 8, 2011

(87) PCT Pub. No.: WO2010/017844
PCT Pub. Date: Feb. 18, 2010

(65) Prior Publication Data
US 2011/0142216 A1   Jun. 16, 2011

(51) Int. Cl.
*H04M 3/42* (2006.01)
(52) U.S. Cl.
USPC ............. 379/201.12; 455/406; 455/405
(58) Field of Classification Search
USPC ................. 379/201.12; 455/405, 406
See application file for complete search history.

(56) References Cited

U.S. PATENT DOCUMENTS

| 8,320,878 B2* | 11/2012 | Vakil et al. ............. 455/406 |
| 2001/0018711 A1 | 8/2001 | Morris |
| 2003/0046409 A1* | 3/2003 | Graham ............... 709/229 |
| 2003/0110485 A1* | 6/2003 | Lu et al. ............... 725/9 |
| 2004/0117311 A1 | 6/2004 | Agarwal et al. |
| 2006/0153074 A1* | 7/2006 | Hurtta et al. ........... 370/230 |
| 2007/0036312 A1* | 2/2007 | Cai et al. ............... 379/126 |
| 2008/0049920 A1* | 2/2008 | Napoleoni et al. ....... 379/201.12 |
| 2008/0235702 A1* | 9/2008 | Eilam et al. ............. 718/104 |
| 2009/0291667 A1* | 11/2009 | Vakil et al. ............. 455/408 |
| 2011/0131277 A1* | 6/2011 | Niemoeller et al. ......... 709/204 |

OTHER PUBLICATIONS

Zhihui Lu et al: "MCSAMS: A Novel WSRF and Multi-agent based Distributed Multimedia Content Service Alliance and Management Scheme" Services, 2007 IEEE Congress on, IEEE, Piscataway, NJ, USA, Jul. 1, 2007 XP031119622 ISBN: 978-0-7695-2926-4.

(Continued)

*Primary Examiner* — Creighton Smith

(57) ABSTRACT

Methods and devices for controlling a charging of a composite service in a telecommunications network are described. The composite service comprises an invocation of a constituent service. The telecommunications network comprises a control node for controlling the composite service, a service node for providing the constituent service, and a charging system for performing the charging. The method comprises the steps of receiving from the service node a first usage report comprising charging indicators related to the invocation of the constituent service, receiving from the control node control information related to the composite service, the control information indicating that the invocation of the constituent service is associated to the invocation of the composite service, generating a further usage report by changing the charging indicators according to the control information, and sending the further usage report to the charging system to instruct the charging system to perform the charging according to the further usage report.

12 Claims, 5 Drawing Sheets

OTHER PUBLICATIONS

3GPP 3$^{rd}$ Generation Partnership Project, Technical Specification Group Services and System Aspects; Telecommunication management; Diameter charging applications (Release 11). 3GPF TS 32.299 v11.6.0 (Dec. 2012).

3GPP 3$^{rd}$ Generation Partnership Project, Technical Specification Group Services and System Aspects; Telecommunication management; Charging management; Charging architecture and principles (Release 11) 3GPP TS 32.240 v11.5.0 (Sep. 2012).

Rigney, "Radius Accounting" Network Working Group. RFC: 2866. Jun. 2000.

Calhoun, et al: "Diameter Base Protocol", Network Working Group, RFC: 3588. Sep. 2003.

* cited by examiner

CONTROLLING THE CHARGING OF A COMPOSITE SERVICE

TECHNICAL FIELD

The present invention relates to handling of charging of composite services within telecommunications networks.

BACKGROUND

Service composition refers to a technology where end user services to be provided to user terminals, e.g. to personal computers, laptop computers, or mobile phones of a telecommunications network, are dynamically built by combining constituent services. The selection of the constituent services as components of the composite service may be performed just in time at user request. The needed constituent services are described in terms of required generic properties. Any service that provides the needed properties can be used as part of the composite service. Rather than fixed binding of a particular service any suitable service within a pool of available services can be selected. The pool of available constituent services can change dynamically by adding new services or by removing them. A composite service can therefore consist of different constituent services at each invocation. Thus, the set of component services that are actually included into a composite service may not be static, but depending on runtime conditions. The constituent services do not need to be specifically designed for service composition. They can be integrated into a composite service, but they can also work as a single service.

From the end user point of view, a telecommunication network is substantially defined by the services it provides. The end user selects desired services from a portfolio of available services. For billing of services provided to the end user, a charging system is provided that is informed by the nodes providing services and applications about user activities. The charging system determines the amount to be charged for the service usage and deducts from the user's account (online charging) or it logs the activity in detail records for later billing (offline charging). Important information used by the charging system is the identification of the user and the details of the provided service, so-called usage information. Various protocols exist to transfer this information from the service nodes to the charging system. Examples are for online charging protocols are RADIUS, standardized for example by the Internet Engineering Task Force (IETF) in the Request For Comments (RFC) 2866, or its successor DIAMETER, standardized by IETF RFC 3588 and in the $3^{rd}$ Generation Partnership Project (3GPP) Technical Specification (TS) 32.299. The roles in charging of the charging system and service nodes are well standardized for example in 3GPP TS 32.240.

In existing telecommunications networks, the charging system independently evaluates usage information of each service provided to the end user terminal. Such approach of separate service processing is reasonable as long as the service tariff does not depend on the other services provided to the user or on the context of a service usage.

In a service environment that is based on service composition, a service request that starts a composite service triggers the invocation of a number of constituent services, each of which being reported to and handled separately by the charging system. However, it may be desirable that the charging of a composite service involves a more flexible charging than the separate charging of the constituent services.

SUMMARY

It is therefore an object of the invention to provide methods, devices, and computer programs that improve charging of composite services.

This object is achieved by the method, device, computer program and a non-transitory computer-readable medium product as described and claimed herein. Advantageous embodiments are also described and claimed herein.

In an embodiment a method for controlling a charging of a composite service in a telecommunications network is disclosed. The composite service comprises an invocation of a constituent service. The telecommunications network comprises a control node for controlling the composite service, a service node for providing the constituent service, and a charging system for performing the charging. The method comprises the steps of receiving from the service node a first usage report comprising charging indicators related to the invocation of the constituent service, receiving from the control node control information related to the composite service, the control information indicating that the invocation of the constituent service is associated to the invocation of the composite service, generating a further usage report by changing the charging indicators according to the control information, and sending the further usage report to the charging system to instruct the charging system to perform the charging according to the further usage report.

The embodiments of the invention provide for a control of a charging of a composite service effecting a flexible charging of the composite service. According to the embodiments the charging indicators related to the invocation of the constituent service are changed according to the control information. The changed charging indicators are sent in a further usage report to the charging system instructing the charging system to perform the charging of the composite service according to the changed charging indicators. This has the effect that the charging of the composite service is controlled based on the control information and does not depend on the charging of the constituent service. Hence the end user is being charged for the composite service and is not exposed to a separate charging of a constituent service.

In a further embodiment an interface node is disclosed. The interface node comprises a receiving unit for receiving messages, a transmitting unit for transmitting messages, a processing unit for controlling further units and for processing messages and information, the processing unit comprising a charging information handling unit. The receiving unit is adapted to receive from the service node a first usage report comprising charging indicators related to the invocation of the constituent service. The processing unit is adapted to process the first usage report. The receiving unit is further adapted to receive from the control unit control information indicating that the invocation of the constituent service is associated to the invocation of the composite service. The processing unit is further adapted to process the control information. The charging information handling unit is adapted to change the charging indicators comprised in the first usage report according to the control information and to generate a further usage report based on the changed charging indicators. The processing unit is further adapted to initiate a transmission via the transmission unit of the further usage report to the charging system to instruct the charging system to perform the charging according to the further usage report.

The invention furthermore concerns a computer program loadable into a processing unit of an interface node to perform any of the steps of the aforementioned methods when operated at the interface node. The computer program can be stored on a computer readable medium. The computer-readable medium can be a permanent or rewritable memory within the interface node or located externally. The computer program can be also transferred to the interface node for example via a cable or a wireless link as a sequence of signals.

In the following, detailed embodiments of the present invention shall be described in order to give the skilled person a full and complete understanding. However, these embodiments are illustrative and are not intended to be limiting.

DETAILED DESCRIPTION

Figure 1:
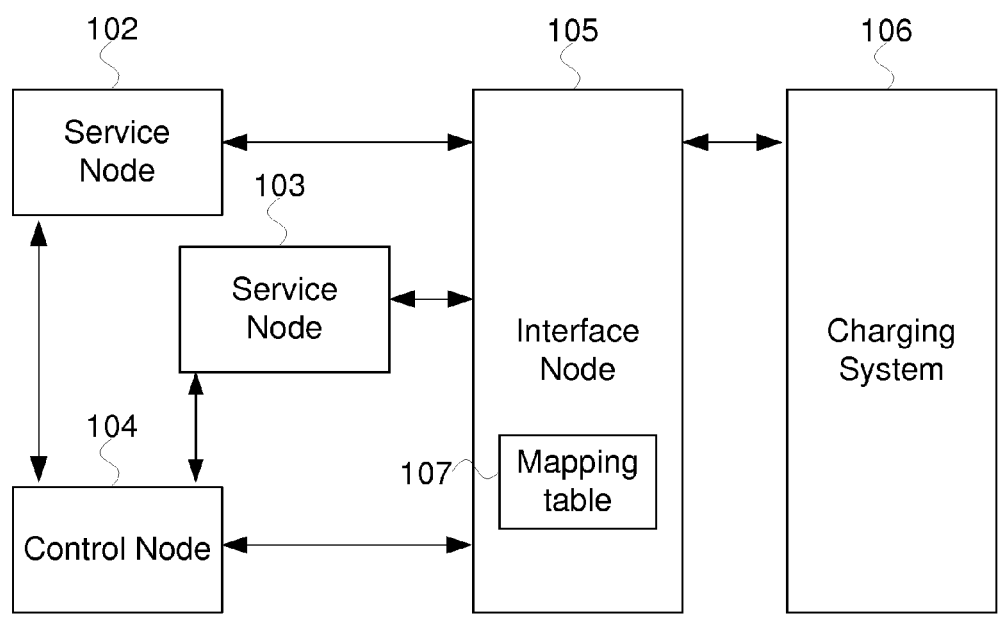
FIG. 1 shows an exemplary arrangement of nodes in a telecommunications network for controlling a charging of composite service.

FIG. 1 depicts an arrangement in a telecommunications network in an exemplary embodiment. Depicted are a first service node 102, a second service node 103, a control node 104, an interface node 105 comprising a mapping table 107 and a charging system 106.

The service nodes 102 and 103 can be any nodes of the telecommunications network that deliver services to end users or user terminals respectively, for example application servers. An application server is a server that hosts an API (Application Programming Interface) to expose services for use by other applications. During or after the execution of a service, the service nodes 102 and 103 may generate a usage report related to the service invocation of the service. The usage report may comprise charging indicators which are indications of the service invocation, for example a service identifier, identification of the end user, date and time of the service invocation, duration of the service invocation, amount of exchanged data between the user terminal and the network during the service invocation, provided quality of service for the service invocation. The usage report forms the base for charging the end user for the service. Further details and examples of the usage report are described with reference to FIGS. 2a and 2b.

The control node 104 is preferably a service composition entity and as such can be regarded as a service node that provides a service by combining other services. The constituent services forming such a composite service might be services provided by the control node 104 itself or they could be services provided by other service nodes, such as service nodes 102 and 103. In the latter case, the control node 104 controls the selection and invocation of services at other service nodes according to the definition of the composite service.

The charging system 106 can be any arrangement that is responsible for the actual charging of the end users according to the provided services. The charging system 106 is able to receive and analyse usage reports generated by the service nodes 102 and 103. Based on the usage report related to the invocation of a service the charging system 106 determines an appropriate tariff and calculates the costs for the end user. The charging system 106 is able to send a reply back towards the service nodes 102 and 103 in order to inform the service nodes 102 and 103 about the result of the charging. For example, the charging system 106 may inform the service nodes 102 and 103 that the balance of the user account of the end user requesting a service is sufficient or not in view of the costs of the usage of the service. The service nodes 102 and 103 may in response decide to continue respectively stop the execution of the invoked service.

The interface node 105 can be any node of the telecommunications system capable of communicating with the service nodes, control nodes and the charging system. Its task is to control and influence the charging of services provided by the service nodes 102 and 103 and the charging of composite services provided by the control node 104. In an embodiment the interface node 105 intercepts, evaluates and changes the communication, i.e. the usage reports and the corresponding replies, between the service nodes 102 and 103 and the charging system 106. The communication may be changed according to logic for controlling the charging. Detailed embodiments are provided with reference to FIGS. 2a and 2b.

In an embodiment the interface node comprises a mapping table 107 which stores and executes the logic for controlling the charging. Detailed examples of a mapping table are provided in Tables 1 and 2 in connection to the embodiments described with reference to FIGS. 2a and 2b.

Figure 2A:
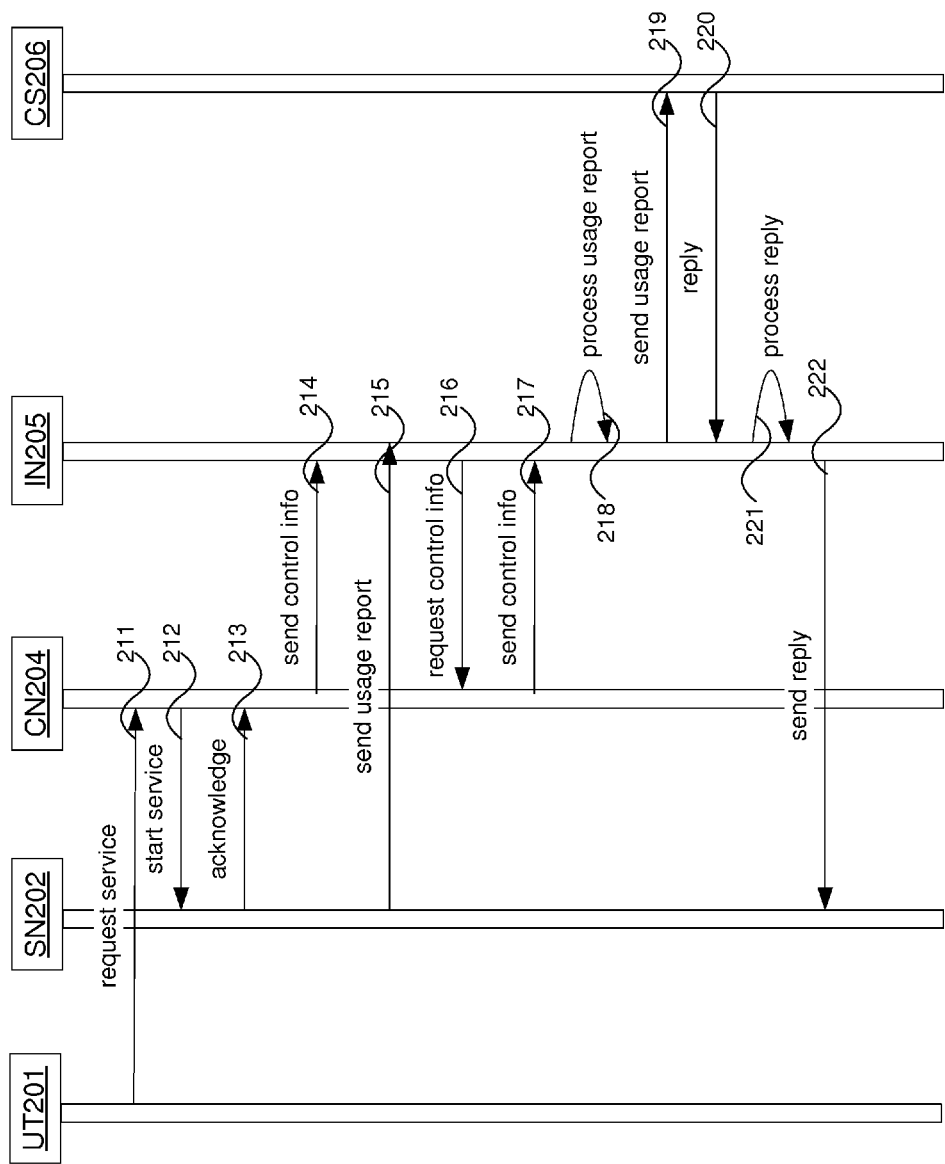
FIG. 2a shows a first sequence diagram depicting exemplary messages exchanged in a telecommunication network according to a first exemplary embodiment of the invention.

FIG. 2a depicts a sequence diagram showing messages exchanged in a telecommunication network in a first exemplary embodiment. The sequence diagram provides exemplary messages that are exchanged between the nodes shown under FIG. 1. Shown in FIG. 2a are a user terminal UT201 (not shown in FIG. 1), a first service node SN202, a control node CN204, an interface node IN205 and a charging system CS206.

In step 211a user terminal UT201 starting a session sends a message to the control node CN204 thereby requesting a service within the session. The message sent by the user terminal UT201 may be a Session Initiation Protocol (SIP) Invite message. The control node CN204 initiates in response an invocation of the requested service, by way of example a composite service named service C consisting of a constituent service named service A. According to this exemplary embodiment, service A resides in the service node SN202. In step 212 the control node CN204 invokes as part of composite service C an instance of service A on the service node SN202, for example by sending a SIP Invite message to the service node SN202. In step 213 the service node SN202 sends a message to acknowledge the invocation of an instance of service A to the control node CN204. The message comprises a service identifier of the instance of service A. The message may be an appropriate SIP message. In step 214 the control node CN204 informs the interface node IN205 of the invocation of service A in the context of composite service C by sending control information related to the service invocation of service A. The control information indicates to the interface node IN205 that the service invocation of the constituent service A is associated to the invocation of the composite service C. The control information comprises the service identifier of the instance of service A as sent in step 213 from the service node SN202 to the control node CN204.

The control information indicating that a service, for example service A, is invoked as part of a composite service, for example service C, may have the following format:

```
NEW_SERVICE (    NAME:       SERVICE_C;
                 ID:         1234;
                 INCLUDES :  ( NAME: SERVICE_A;
                               ID: 3456 ))
```

The interface node IN205 receives the control information from the control node CN204, preferably over a dedicated control interface between the control node CN204 and the interface node IN205 using XML (Extensible Markup Language).

During or after the execution of service A, the service node SN202 generates a usage report related to the service invocation of service A. As explained above the usage report may comprise charging indicators which are indications of the service invocation, for example a service identifier, and other particulars of the service invocation. In step 215 the service node SN202 sends the usage report related to service A towards the charging system CS206, either in one message or distributed over a plurality of messages. The interface node IN205 intercepts the usage report before it arrives at the charging system CS206. The interface node IN205 analyses the usage report and then determines if the service invocation of service A occurred in the context of a composite service or as a single service invocation. If a service invocation relates to a composite service, the charging of the service invocation may be treated differently.

The determination whether the service invocation of service A is related to a composite service or not, is based on the control information related to the composite service that was received by the interface node IN205 in step 214. According to the control information of this exemplary embodiment service A is indeed invoked as part of a composite service C. In step 216 the interface node 205 requests the control node CN204 for further control information providing instructions as to how to modify the charging indicators in the usage report generated by the service node SN202 in order to influence the charging of the service invocation performed by the charging system CS206. In step 217 the control node CN204 sends the further control information. Alternatively, the control information sent in step 214 may already comprise the instructions in which case steps 216 and 217 are obsolete. According to a further embodiment, the control information sent in step 214 may be sent in combination with the control information in step 217 making step 214 obsolete.

The control information indicating the instructions for changing the charging indicators in the usage report may be implemented in the interface node IN205 as a mapping table 107. The mapping table 107 provides a translation from an incoming message or event, e.g. a usage report corning from the service node or control information received from the control node CN204, to the application of a procedure or action, e.g. modifying the incoming message and sending it to the charging system CS206 or logging of events or incoming messages. An example of entries of a mapping table is given in Table 1:

TABLE 1 exemplary mapping table

| Interception Condition | Action |
|---|---|
| Intercept Message from Service Node if<br>Service: Service A<br>ServiceID: 3456 | Create Session as part of<br>"Service_C0001"<br>Replace service: Service_X<br>Replace ServiceID:<br><session for A><br>Forward to Charging System |
| Intercept Message from Charging System if<br>Service: Service X<br>ServiceID: <session for A/X> | Inform Session <session for A><br>Restore original Service and ServiceID<br>Send to Service Node |

According to the example of Table 1, the interface node IN205 obtains control information indicating that the service invocation of service A relates to a composite service C and that in the context of the composite service C, service A should be charged as service X. The charging system CS206 comprises data and logic for the charging of service X. In step 218 the interface node IN205 adapts the usage report received from the service node SN202 such that it reflects that the service invocation relates to service X, e.g. by modifying the name of the invoked service and the service identifier of the invoked service as is specified in the first row of Table 1, i.e. replace the service name "Service A" by "Service X" and replace the service identifier of service A by a service identifier of service X. In addition, but not depicted in Table 1, the interface node IN205 may log an indication that service A has been invoked in the context of a composite service C for future reference.

In step 219 the adapted usage report is sent to the charging system CS206 effecting that charging is applied by the charging system CS206 for service X. Hence the interface node IN205 has taken control of the charging of the service invocation of service A as part of composite service C and thereby effected that a different charging tariff is applied for service A in this context without necessitating modifications to the logic and data of the charging system CS206. Optionally, the charging system CS206 sends in response a reply message comprising instructions related to the charging in step 220. For example, the charging system CS206 may indicate in its reply message that the service is allowed to be continued or alternatively that the service should be denied in view of the balance of the account of the end user. In step 221 the interface node IN205 processes the reply message according to a corresponding instruction indicated by the control information, for example as indicated by the entry of the mapping table depicted in the second row of Table 1. As a result the interface node IN205 restores the service name and service identifier of service A, replaces the service name and the service identifier of service X in the reply message with the service identifier of service A and sends the modified reply message to the service node SN202 in step 222. This has the effect that the interface node IN205 controls the messages coming from the charging system CS206 and that the service node SN202 receives information which is in accordance with its own knowledge of the invoked services.

In alternative embodiment and not depicted in FIG. 2a, the interface node IN205 may inform the control node CN204 about the usage report received from the service node SN202 and the applied instructions in response, by sending a report to the control node CN204 comprising an indication of the usage report received from the service node SN202 and an indication of the adapted usage report sent to the charging system CS206.

Figure 2B:
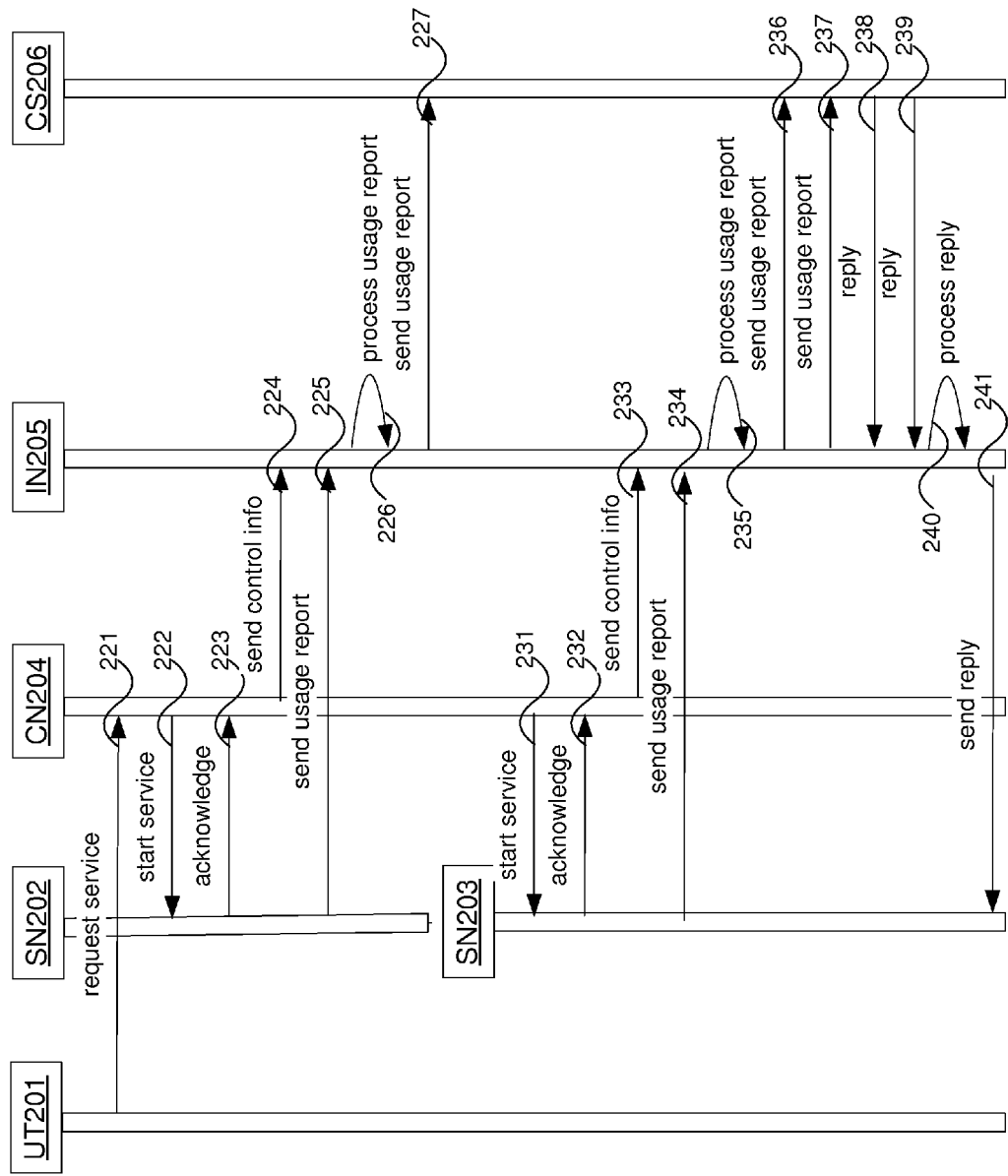
FIG. 2b shows a second sequence diagram depicting exemplary messages exchanged in a telecommunication network according to a second exemplary embodiment of the invention.

Referring to FIG. 2b, an alternative sequence diagram of messages exchanged in an arrangement of nodes in telecommunications network is provided. The arrangement is similar to the arrangement shown under FIG. 2a but additionally comprises a second service node. Depicted are a user terminal UT201, a first service node SN202, a second service node SN203, a control node SN204, an interface node IN205 and a charging system CS206. According to this exemplary embodiment a composite service named service C is invoked comprising a first constituent service named service A and a second constituent service named service B. Service A resides on the first service node SN202 and service B resides on the second service node SN203.

In step 221 a user terminal UT201 starting a session sends a message to the control node CN204 thereby requesting a service within the session. The message sent by the user terminal UT201 may be a Session Initiation Protocol (SIP) Invite message. The control node CN204 initiates in response an invocation of the requested service, which is the composite service named service C consisting of the constituent services service A and service B. In step 222 the control node CN204 invokes as part of composite service C an instance of service A on the service node SN202, for example by sending a SIP Invite message to the service node SN202. In step 223 the service node SN202 sends a message to acknowledge the invocation of an instance of service A to the control node CN204. The message comprises a service identifier of the instance of service A. The message may be any appropriate SIP message. In step 224 the control node CN204 sends control information related to the service invocation to the interface node IN205. The control information indicates to the interface node IN205 that the service invocation of service A is related to a composite service C. The control information may have the following format:

| | | |
|---|---|---|
| NEW_SERVICE ( | NAME: | SERVICE_C; |
| | ID: | 1234; |
| | INCLUDES: | ( NAME: SERVICE_A; |
| | | ID: 3456 )) |

Furthermore, the control information sent in step 224 comprises an indication of instructions for processing the usage report generated by the service node SN 202 in relation to the invocation of service A. The instructions are stored in the mapping table of the interface node IN205 and are similar to the exemplary entries in the mapping table depicted in Table 1 with reference to FIG. 2a.

The information in the first row in Table 1 indicates to the interface node IN205 that the service invocation of service A with the specified service identifier relates to a composite service C and that in the context of a composite service, service A should be charged as service X. The charging system CS206 comprises data and logic for the charging of service X.

In step 225 the service node SN202 sends a usage report comprising charging indicators related to the invocation of service A towards the charging system CS206. The usage report is intercepted by the interface node IN205. In step 226 the interface node IN205 processes the usage report in accordance with the control information received from the control node CN204. In this example the interface node IN205 adapts the usage report received from the service node SN202 in step 225 such that it reflects that the service invocation relates to service X. The interface node IN205 may do this by modifying the name of the invoked service and the service identifier of the invoked service as is specified in the first row of Table 2, i.e. replace the service name "Service A" by "Service X" and replace the service identifier of service A by a service identifier of service X. In step 227 the adapted usage report is sent to the charging system CS206 effecting that charging is applied by the charging system CS206 for service X.

Optionally and not depicted in FIG. 2b, the charging system CS206 may send in response a reply message which may be processed by the interface node IN205 as explained with reference to the example of FIG. 2a and in accordance with the instructions specified by the second row of Table 1.

In step 231 the control node CN204 invokes as a further part of composite service C an instance of service B on the service node SN203, for example by sending a SIP Invite message to the service node SN203. In step 232 the service node SN203 sends a message to acknowledge the invocation of an instance of service B to the control node CN204. The message comprises a service identifier of the instance of service B. The message may be an appropriate SIP message. In step 233 the control node CN204 sends control information related to the service invocation to the interface node IN205. The control information indicates to the interface node IN205 that the service invocation of service B is related to the composite service C. The control information includes the service identifier of the instance of service B as sent by the service node SN203 in steps 232. The control information may have the following format:

| | | |
|---|---|---|
| UPDATE_SERVICE ( | NAME: | SERVICE_C; |
| | ID: | 1234; |
| | ADDED: | ( NAME: SERVICE_B; |
| | | ID: 4567 )) |

The mapping table 107 of the interface node IN205 is updated accordingly. Furthermore, the control information sent in step 223 comprises an indication of instructions for changing the charging indicators in the usage report generated by the service node SN 203 in relation to the invocation of service B. The instructions are stored in the mapping table of the interface node IN205. Exemplary entries are depicted in Table 2.

TABLE 2 exemplary mapping table

| Interception Condition | Action |
|---|---|
| Intercept Message from Service Node if<br>   Service: Service A<br>   ServiceID: 3456 | Create Session as part of "Service_C0001"<br>Replace service: Service_X<br>Replace ServiceID: <session for A><br>Forward to Charging System |
| Intercept Message from Service Node if<br>   Service: Service B<br>   ServiceID: 4567 | Create Session as part of "Service_C0001"<br>Forward message<br>Report New Service: Service_Y<br>Replace ServiceID: <session for B> |
| Intercept Message from Charging System if<br>   Service: Service X<br>   ServiceID:<br>   <session for A/X> | Inform Session <session for A><br>Restore original Service and ServiceID<br>Send to Service Node |
| Intercept Message from Charging System if<br>   Service: Service B<br>   ServiceID: 4567 | Apply Policy SERVICE_C_CS_REPLY_FOR_B |

TABLE 2-continued exemplary mapping table

| Interception Condition | Action |
|---|---|
| Intercept Message from Server if<br>    Service: Service Y<br>    ServiceID:<br>    <session for Y> | Apply Policy<br>SERVICE_C_CS_REPLY_FOR_Y |

The service node SN203 generates a usage report related to the service invocation of service B and in step 234 the service node SN203 send the usage report towards the charging system CS206. The usage report is intercepted by the interface node IN205. In step 235 the interface node processes the usage report in accordance with the control information received from the control node CN204.

In this example and as specified in the second row of Table 2, the interface node IN205 forwards in step 236 the usage report related to the service invocation of service B unchanged to the charging system. Additionally the interface node IN205 issues a further usage report for a service Y and sends it to the charging system CS206 in step 237. The charging system CS206 comprises data and logic for the charging of service Y. The purpose of service Y is to apply additional charges or refunds to the charging of service B effecting a different charging for the use of service B as part of a composite service C compared to the use of service B as a single service.

The fourth and fifth rows in Table 2 specify examples for processing by the interface node IN205 of the reply messages sent by the charging system CS206 for service B and service Y in steps 238 and 239 respectively. The specified action is to apply policies in order to co-ordinate the separate reply messages. For example, the charging system CS206 may indicate in its reply message for service B that service B is denied for the end user, whereas it may indicate in its reply message for service Y that it is allowed to be provided.

The policies can be specified according to the following example:

```
SERVICE_C_CS_REPLY_FOR_B:
Reply from CS for SERVICE_Y is
    "Service Approved":
            Restore original Service and ServiceID
            Apply decision "Service Approved" to SERVICE_B
            Send to Service Node
    "Deny Service":
            Restore original Service and ServiceID
            Apply decision "Deny Service" to SERVICE_B
            Send to Service Node
    Not available:
            Mark that reply for SERVICE_B was received and
            wait
END
SERVICE_C_CS_REPLY_FOR_Y:
Reply for SERVICE_B already received?
    YES:
            REPLY from CS for SERVICE_Y is
                "Service Approved":
                    Restore original Service and ServiceID
                    Apply decision "Service Approved" to
                    SERVICE_B
                    Send to Service Node
                "Deny Service":
                    Restore original Service and ServiceID
                    Apply decision "Deny Service" to
                    SERVICE_B
                    Send to Service Node
            END
    NO:
            Mark that reply for SERVICE_B was received and wait
END
```

The policies of above example entail that the reply regarding service B from the charging system CS206 is ignored and only the reply of the charging system CS206 for service Y is considered. When preparing the reply for service B to be sent to the service node SN203, the decision related to service Y is copied into the message for service B. This implies that the sending of the message to the service node SN203 needs to wait until both replies are available.

In step 240 the interface node IN205 processes the reply messages according to above exemplary policies and sends the resulting modified reply message to the service node SN203 in step 241.

Figure 3:
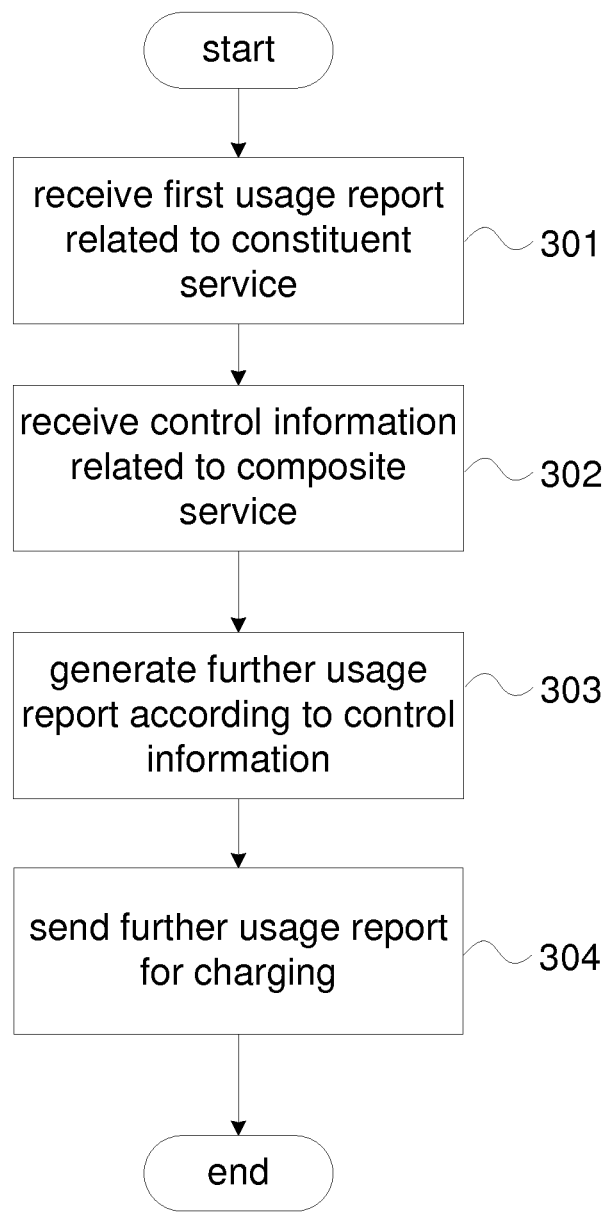
FIG. 3 shows a flow diagram of exemplary steps performed by an interface node of the arrangement of FIG. 1, FIG. 2a or FIG. 2b.

FIG. 3 depicts exemplary steps performed by the interface node of FIGS. 2*a* and 2*b* according to an embodiment of the invention.

In a first step 301, the interface node receives from a service node a first usage report comprising charging indicators related to the invocation of the constituent service.

In a second step 302 the interface node receives control information related to the composite service. The control information indicates that the invocation of the constituent service is associated to the invocation of the composite service. The control information may be received from a control node.

In a third step 303 the interface node generates a further usage report by changing the charging indicators according to the control information.

In a fourth step 304 the interface node sends the further usage report to a charging system to instruct the charging system to perform the charging according to the further usage report.

The method may end here or may continue with any of the steps described herein.

In an embodiment the control information further indicates instructions for changing the charging indicators.

In an embodiment the charging indicators comprise a service identifier identifying the constituent service.

In an embodiment the instructions for changing the charging indicators comprise replacing the service identifier identifying the constituent service by a service identifier identifying a further constituent service. This has the effect that a further constituent service is reported to the charging system instead of or in addition to the originally invoked constituent service. The charging system processes the charging indicators related to the further constituent service and hence performs a charging according to this further constituent service effecting a different charging.

In an embodiment the interface node performs the following further steps:
    receiving from the charging system a reply message based on the charging according to the further usage report,
    adapting the reply message based on instructions for changing the reply message indicated by the control information, and
    sending the adapted reply message to the service node.

Advantageously the interface node is now enabled to synchronize the information about the invoked constituent service as known to the charging system indicated by the further usage report, with the information about the invoked constituent service as known to the service node and indicated in the first usage report. The interface node may for example restore service identifiers from the first usage report and include them in the reply from the charging system before sending the reply to the service node. Any errors based on a mismatch of information communicated between the service node and the charging system, such as a service identifier or a service name, when processing the reply message from the charging system by the service node are avoided.

In a further embodiment the reply message instructs the service node to stop or to continue the constituent service depending on the control information.

In an embodiment the interface node sends a report to the control node comprising an indication of the first usage report received from the service node and an indication of the further usage report. This has the advantage that the control node is enabled to keep a log of exchanged usage reports for optimizing future control information.

Figure 4:
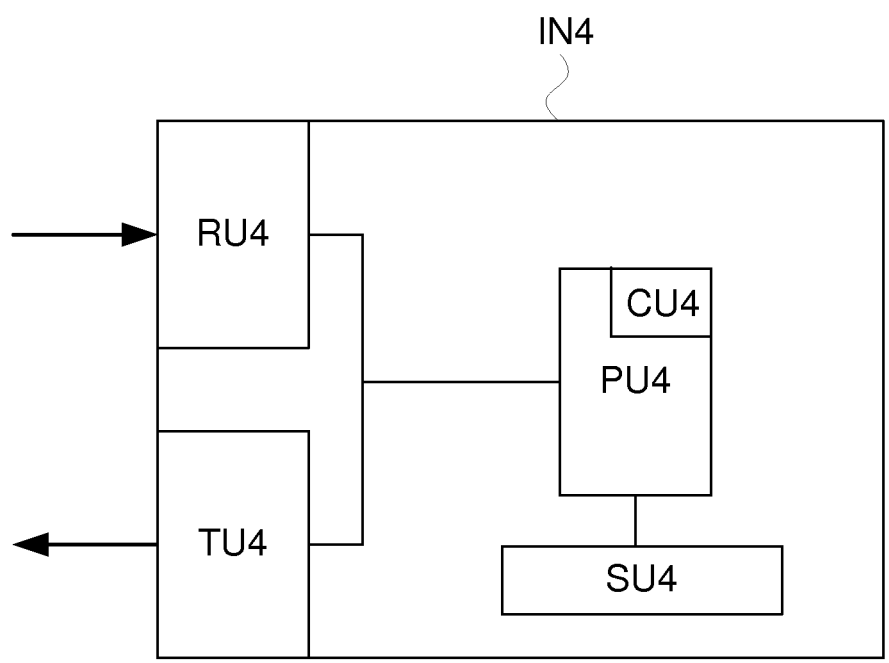
FIG. 4 shows an exemplary block diagram of the interface node of FIG. 3.

FIG. 4 depicts an embodiment of the interface node IN4 of FIG. 3 comprising a receiving unit RU4 for receiving messages, a transmitting unit TU4 for transmitting messages, a processing unit PU4 for controlling further units and for processing messages and information, the processing unit PU4 comprising a charging information handling unit CU4, and preferably a storage unit SU4 for storing and/or obtaining of stored information.

An interface node may be a stand alone device. However, it is also conceivable that an interface node is operating at a control node, e.g. as a hardware and/or software sub-unit of the control node. The interface node may be installed and operated at the control node sharing none of the units RU4, TU4, PU4, SU4 with the control node or sharing at least one of the units RU4, TU4, PU4, SU4 with units of the control node.

The processing unit PU4 may be adapted to process a first usage report comprising charging indicators related to the invocation of the constituent service, received via the receiving unit RU4 from the service node. Furthermore, the processing unit PU4 may be adapted to process control information indicating that the invocation of the constituent service is associated to the invocation of the composite service, received via the receiving unit RU4 from the control node. The charging information handling unit CU4 may be adapted to change the charging indicators comprised in the first usage report according to the control information and to generate a further usage report based on the changed charging indicators. The processing unit PU4 may be adapted to initiate a transmission via the transmission unit TU4 of the further usage report to the charging system to instruct the charging system to perform the charging according to the further usage report.

In an embodiment, the control information further indicates instructions for changing the charging indicators. The processing unit PU4 may be adapted to process the instructions for changing the charging indicators. In particular, the processing unit PU7 may be adapted to extract the instructions for changing the charging indicators from the usage report. In addition, the charging information handling unit CU4 may be adapted to change the charging indicators based on the instructions.

In an embodiment, the charging indicators comprise a service identifier identifying the constituent service. The processing unit PU4 may be adapted to process the service identifier. In particular, the processing unit PU7 may be adapted to extract the service identifier from the usage report.

In an embodiment, the instructions for changing the charging indicators comprise replacing the service identifier identifying the constituent service by a service identifier identifying a further constituent service.

In an embodiment, the processing unit PU4 may be adapted to process a reply message based on the charging according to the further usage report, received via the receiving unit RU4 from the charging system. In an even further embodiment the control information indicates instructions for changing the reply message. The charging information handling unit CU4 may be adapted to adapt the reply message based on the instructions for changing the reply message indicated by the control information. Furthermore the processing unit PU4 may be adapted to initiate a transmission via the transmission unit TU4 of the adapted reply message to the service node.

In an embodiment, the reply message instructs the service node to stop or to continue the constituent service depending on the control information.

In an embodiment, the processing unit PU4 may be adapted to initiate a transmission via the transmission unit TU4 of a report to the control node comprising an indication of the first usage report received from the service node and an indication of the further usage report.

In an embodiment, the processing unit PU4 comprises a mapping table for storing the instructions indicated by the control information.

The invention may be implemented in any telecommunication network like a GSM, Code Division Multiple Access (CDMA), Time Division Multiple Access (TDMA), Universal Mobile Telecommunication System (UMTS), or a $4^{th}$ Generation (4G) network.

The invention claimed is:

1. A method for controlling a charging of a composite service in a telecommunications network, the composite service comprising an invocation of a constituent service, the telecommunications network comprising a control node for controlling the composite service, a service node for providing the constituent service, and a charging system for performing the charging, and an interface node communicating with the control node, service node and charging system, wherein the interface node implements steps of:
   receiving, by the interface node from the control node, control information related to the composite service, the control information indicating that the constituent service is invoked in a context of the composite service,
   intercepting, by the interface node, a first usage report sent by the service node to the charging system, the first usage report comprising charging indicators related to the invocation of the constituent service,
   generating, by the interface node, a further usage report by modifying a service name and a service identifier of the charging indicators in the first usage report according to the control information, and
   sending, by the interface node, the further usage report to the charging system to instruct the charging system to perform the charging according to the further usage report.

2. The method according to claim 1 where the interface node has a mapping table, further comprising the step of storing received control information in a mapping table as intercept conditions—action pairs.

3. The method according to claim 1 further comprising the step of requesting the control node further control information after having intercepted the first usage report.

4. The method according to claim 2 further comprising the step of logging of events or incoming messages.

5. The method according to claim 1, further comprising sending a report to the control node comprising an indication of the first usage report received from the service node and an indication of the further usage report.

6. The method according to claim 1, further comprising:
receiving from the charging system a reply message based on the charging according to the further usage report,
adapting the reply message based on instructions for changing the reply message indicated by the control information, and
sending the adapted reply message to the service node.

7. The method according to claim 6, wherein the reply message instructs the service node to stop or to continue the constituent service depending on the control information.

8. The method according to claim 1 where modifying a service identifier comprises replacing the service name and the service identifier of a constituent service by a service name and a service identifier identifying a further constituent service.

9. An interface node comprising a receiving unit for receiving messages, a transmitting unit for transmitting messages, a processing unit for controlling further units and for processing messages and information, the processing unit comprising a charging information handling unit for changing charging indicators based on control instructions, the interface node is specially configured to:
receive, from a control node, control information related to a composite service, the control information indicating that a constituent service is invoked in a context of the composite service,
intercept a first usage report sent by a service node to a charging system, the first usage report comprising charging indicators related to the invocation of the constituent service,
generate a further usage report by modifying a service name and a service identifier of the charging indicators in the first usage report according to the control information, and
send the further usage report to the charging system to instruct the charging system to perform the charging according to the further usage report.

10. A non-transitory computer program loadable into a processing unit of an interface node, the non-transitory computer program comprising portions of software code adapted to perform following steps:
receiving, from a control node, control information related to a composite service, the control information indicating that a constituent service is invoked in a context of the composite service,
intercepting a first usage report sent by a service node to a charging system, the first usage repot comprising charging indicators related to the invocation of the constituent service, the service node providing the constituent service,
generating a further usage report by modifying a service name and a service identifier of the charging indicators in the first usage report according to the control information, and
sending the further usage to the charging system to instruct the charging system to perform the charging according to the further usage report.

11. A non-transitory computer-readable medium product comprising a computer program loadable into a processing unit of an interface node, the computer program comprising portions of software code adapted to perform following steps:
receiving, from a control node, control information related to a composite service, the control information indicating that a constituent service is invoked in a context of the composite service,
intercepting a first usage report sent by a service node to a charging system, the first usage report comprising charging indicators related to the invocation of the constituent service, the service node providing the constituent service,
generating a further usage report by modifying a service name and a service identifier of the charging indicators in the first usage report according to the control information, and
sending the further usage report to the charging systems to instruct the charging system to perform the charging according to the further usage report.

12. A control node comprising an interface node which comprises a receiving unit for receiving messages, a transmitting unit for transmitting messages, a processing unit for controlling further units and for processing messages and information, the processing unit comprising a charging information handling unit for changing charging indicators based on control instructions the interface node is configured to:
receive, from a control node, control information related to a composite service, the control information indicating that a constituent service is invoked in a context of the composite service,
incept a first usage report sent by a service node to a charging system, the first usage report comprising charging indicators related to the invocation of the constituent service, the service node providing the constituent service,
generate a further usage report by modifying a service name and a service identifier of the charging indicators in the first usage report according to the control information, and
send the further usage report to the charging system to instruct the charging system to perform the charging according to the further usage report.

* * * * *

UNITED STATES PATENT AND TRADEMARK OFFICE
CERTIFICATE OF CORRECTION

PATENT NO.        : 8,472,601 B2  
APPLICATION NO.   : 13/058031  
DATED             : June 25, 2013  
INVENTOR(S)       : Niemoeller et al.

Page 1 of 1

It is certified that error appears in the above-identified patent and that said Letters Patent is hereby corrected as shown below:

On the Title Page, in Item (75), under "Inventors", in Column 1, Line 3, delete "Stockholm (DE);" and insert -- Stockholm (SE); --, therefor.

On Title Page 2, in Item (56), under "OTHER PUBLICATIONS", in Column 1, Line 3, delete "3GPF TS" and insert -- 3GPP TS --, therefor.

In the Specification

In Column 5, Line 61, delete "corning" and insert -- coming --, therefor.

In the Claims

In Column 13, Line 54, in Claim 10, delete "repot" and insert -- report --, therefor.

In Column 14, Line 8, in Claim 10, delete "usage to" and insert -- usage report to --, therefor.

In Column 14, Line 36, in Claim 12, delete "instructions the" and insert -- instruction, the --, therefor.

In Column 14, Line 41, in Claim 12, delete "incept" and insert -- intercept --, therefor.

Signed and Sealed this  
First Day of April, 2014

Michelle K. Lee  
*Deputy Director of the United States Patent and Trademark Office*